UNITED STATES PATENT OFFICE.

EDWARD C. C. STANFORD, OF GLASGOW, SCOTLAND.

IMPROVEMENT IN DEODORIZING ANIMAL MATTERS FOR FERTILIZERS, &c.

Specification forming part of Letters Patent No. 137,969, dated April 15, 1873; application filed March 22, 1873.

*To all whom it may concern:*

Be it known that I, EDWARD CHARLES CORTIS STANFORD, of Glasgow, Lanarkshire, Scotland, have invented an Improved System for Deodorizing Solid and Liquid Matters, of which the following is a specification:

One object of my said invention is to improve what is generally known as the "dry-closet" system of dealing with excreta, which has been put in practice in one form under "Moule's patents," so that it can be successfully applied to large towns and cities, and so that the entire value of the excreta can be economically recovered in marketable chemical products.

In practically carrying out my invention I employ, instead of earth, some kind of charcoal, and, to begin with, I prefer sea-weed charcoal on account of its high absorptive power, the ease with which large quantities of it can be obtained, and its cheapness; but any other charcoal may be used at first. The charcoal is in a granular form, and is used in the same way as the earth in the ordinary dry-closet, and with the aid of the same or similar appliances or apparatus; or it may be used in ordinary privies and urinals without any self-acting appliances. When the mixed product is removed it is carted to a factory conveniently situated, where, if stored in bulk, it soon becomes dry, or, at any rate, in a condition requiring very little heat to dry it, and then the dust is sifted out and the charcoal returned to the closets, the dust being used as manure. It may be thus treated and returned to the closets five times, and when used in urinals ten times. After that it is reburned like the charcoal used in sugar refineries, but with arrangements provided for condensing and securing the products of the destructive distillation. The charcoal is in this way perpetually renewed, and it is improved by each reburning. The whole of the nitrogen of the excreta is secured as ammonia in the liquid distillate, while the potash and phosphoric acid accumulate in the charcoal, together with the additional carbon from the organic matter of the excreta. Whatever charcoal be used at first the ultimate result is that the excreta are absorbed and deodorized by a charcoal derived from themselves, and so far from their being any difficulty in securing a supply of the deodorant employed, a city adopting my process would, in addition to securing the ammonia and other products of destructive distillation, become sellers of a charcoal second in value only to that from bones—the product, in fact, of disintegrated bone and muscle.

The cost of the fuel for reburning is not more than that necessarily used for drying any material employed in dry-closets. The dust is sifted out from the reburned charcoal for sale as manure, and what is returned to the closets is in the form of coarse grains, thus avoiding the projection of dust which is sometimes complained of in dry-closets when the earth is too dry.

In using the charcoal in public urinals it is kept separate from that used in the closets, as the lime phosphate in the charcoal from urinals rapidly rises to twenty-five per cent., at which strength, being free from lime carbonate, it becomes a most valuable charcoal for the sugar refiner, and may supersede that obtained from bones. The ammonia is perfectly retained and all secured by reburning. When the charcoal is used for refining sugar the potash and soda-salts are washed out and separately recovered.

My improved system for applying and reburning the charcoal is also suitable for dealing with blood from slaughter-houses, animal refuse, fish offal, distillery refuse, and other nitrogenous matters, the details and procedure being, of course, modified and adapted to suit each application, while in all cases it secures complete freedom from odor. In the case of sewage or waste or impure liquids of any kind containing organic or putrescible matters in suspension, the charcoal is to be used as a filtering medium, and when fully charged with the matters which it retains from the liquids passing through is to be dried and reburned in the manner hereinbefore described.

What I claim as my invention is—

The process herein described of deodorizing solid or liquid matters by subjecting the same to the action of granulated charcoal, either alone or mixed with earthy matter, as described, the charcoal being afterward recovered and revivified for successive uses in the manner herein shown, for the purpose specified.

EDWARD C. C. STANFORD.

Witnesses:
 EDMUND HUNT,
 GOTTFR. LINDGUISTER.